Sept. 23, 1952 O. B. GUNBY 2,611,828
MAGNETIC RECORD EDITING DEVICE
Filed May 31, 1950
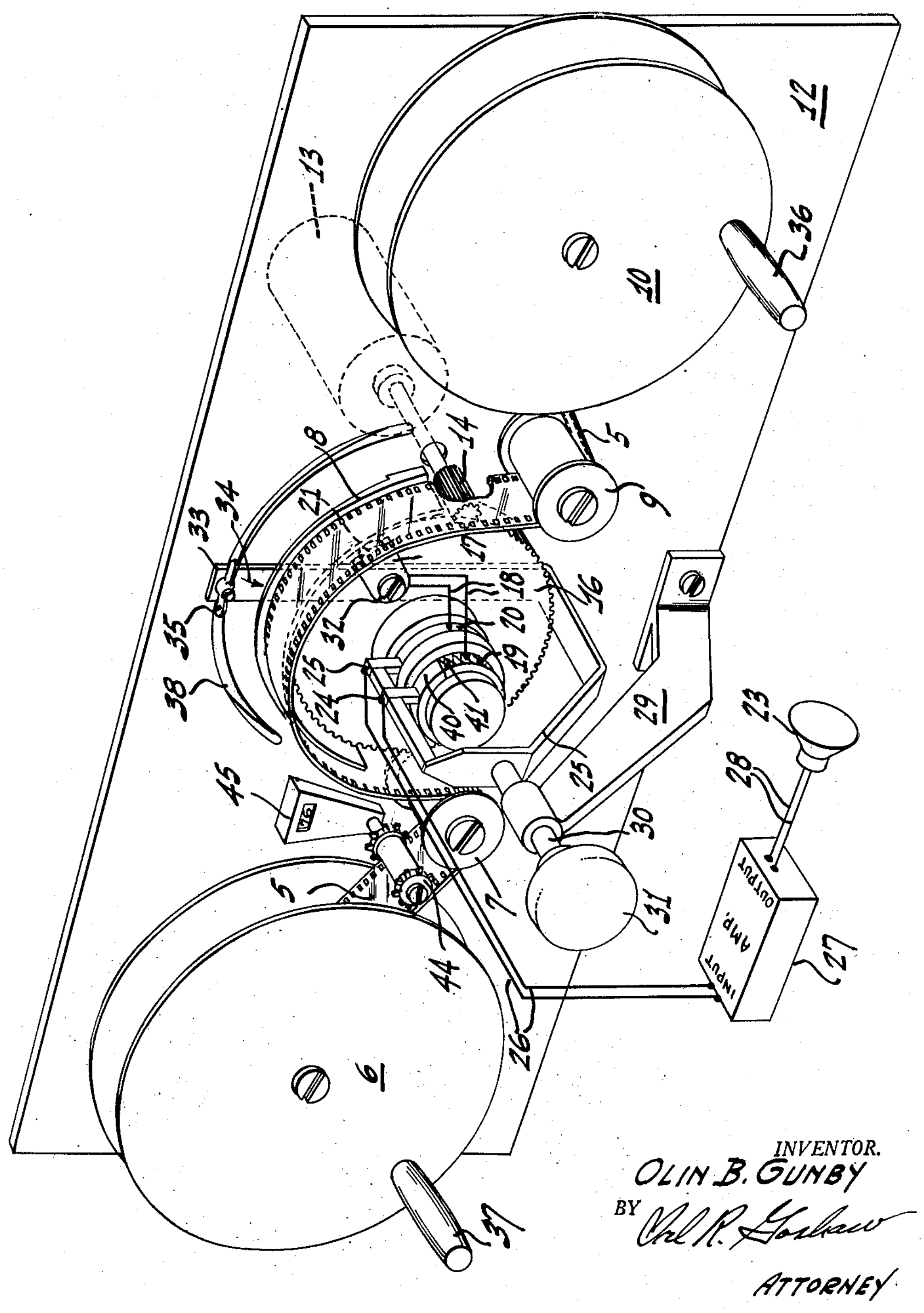
INVENTOR.
OLIN B. GUNBY
BY [signature]
ATTORNEY Patented Sept. 23, 1952 2,611,828

UNITED STATES PATENT OFFICE 2,611,828

MAGNETIC RECORD EDITING DEVICE

Olin B. Gunby, Los Angeles, Calif., assignor to Radio Corporation of America, a corporation of Delaware Application May 31, 1950, Serial No. 165,259

12 Claims. (Cl. 179—100.2)

This invention relates to sound reproducing apparatus, and particularly to a magnetic sound record reproducing and editing device.

With the advent of magnetic sound recording and reproduction, editing devices are needed to cut and edit the sound track. This is true particularly in motion picture production where the sound record is recorded on a film separate from the film on which the concomitant pictures are photographed. In prior motion picture sound recording systems, a photographic track was visible after development. Thus, a particular point on the track could be located visually. To locate such a point at which the track is to be cut or is to be modified in some manner or other, a device such as disclosed and claimed in U. S. Patent No. 2,235,029 of March 18, 1941, is used. Since magnetic sound records are invisible, other types of devices are required to locate the desired point on a magnetic sound track. In co-pending application, Ser. No. 9,300, filed February 18, 1948, a magnetic sound track editing system is disclosed and claimed, this system superimposing the image of the sound track upon the magnetic track.

My system is one wherein, through a simple adjustment of the slip rings connected to a rotating magnetic head, the exact point at which the film is to be modified is indicated. The use of rotating magnetic heads to reproduce a stationary magnetic record is known, such types of heads being shown in the above mentioned co-pending application and in U. S. Patent No. 2,352,023 of July 20, 1944, and in U. S. Patent No. 2,424,295 of July 22, 1947. However, the simple reproduction of the film by rotating heads is not of itself sufficiently accurate to provide the exact point at which the sound track is to be changed or the film cut. My device permits the exact locating of any particular spot on the film quickly and accurately.

The principal object of the invention, therefore, is to facilitate the editing or locating of a particular point on an invisible sound track.

Another object of the invention is to provide an improved magnetic sound record editing device.

A further object of the invention is to provide an improved magnetic sound editor which will accurately locate a particular point on a magnetic sound track.

Although the novel features which are believed to be characteristic of this invention will be pointed out with particularity in the appended claims, the manner of its organization and the mode of its operation will be better understood by referring to the following description, read in conjunction with the accompanying drawing, forming a part hereof, in which the single figure is a perspective diagrammatic view of a system embodying the invention.

Referring now to the drawing, a magnetic film 5 is shown passing from a reel 6 under a guide roller 7 over a stationary shoe 8 under a guide roller 9 and to reel 10. These elements are mounted on a panel 12 behind which is mounted a motor 13 having a drive pinion 14 on the motor shaft. Mounted for rotation by the pinion 14 is a geared casting 16, on which a magnetic head 17 is mounted, and which is connected by conductors 18 to a pair of slip rings 19 and 20. It will be noted that the shoe 8 is narrower than the film 5, so that the film overhangs the shoe and permits the gap 21 of the head 17 to contact that portion of the film unsupported by the shoe 8.

To carry the output of the head 17 to a loudspeaker 23, two conducting brushes 24 and 25 are in contact with the slip rings 19 and 20 and are mounted on an insulated bracket 25. The brushes are connected over conductors 26 to a reproducing amplifier 27 and then to the loudspeaker 23 over conductors 28. The bracket 25 is mounted for partial rotation on a shaft 32 in panel 12 and on shaft 30 coaxial therewith. The shaft 30 is supported by a bracket 29 attached to the panel, and may be turned by a hand wheel 31. Rotation of the shaft 30 moves the brushes 24 and 25 over the slip rings 19 and 20. The upper end of the back portion of the bracket contains an indicator plate 33, on which is an arrow 34. A bolt slidable in a groove 38 in the panel has a wing lock nut 35 thereon to lock the bracket 25 in position. Thus, if the bracket is rotated, the plate 33 will move likewise, and the arrow 34 will correspond with the position of the brushes 24 and 25.

To operate the editor, the head 17 is held stationary in any position where it contacts the film 5, and the film is moved thereover by turning one of the reels by the respective handles 36 and 37. The direction of the film over the head will depend on the direction that the film is wound on the reel. As the film passes over the head, it will be reproduced, and when the point sought is heard, the film is stopped and backed up to approximately that point. The motor 13 is then energized and the head 17 rotated at a speed approximating the speed of the film during recording. If the point to be found is not on the shoe 8, the film may be either moved forward or backward by the handles 36 and 37 until the point is being reproduced. The film is then held stationary and the brushes 24 and 25 are rotated until the point sought is found. For instance, if the point to be located is the beginning of a sound passage, then the brushes are moved to the point where the sound begins to be reproduced while on the shoe 8, and the arrow will point to this spot on the film.

To accomplish this result, slip ring 19 is only conducting over a portion of its length substantially corresponding to the length of the shoe 8, while the other portion of the ring is non-conducting. That is, portion 40 may be conducting and portion 41 may be non-conducting. The other ring is conducting over its entire length. Thus, if the entire portion of the film on the shoe 8 had a signal thereon, no portion would be reproduced unless brush 24 was contacting conducting segment 40. If the non-conducting segment 41 were in contact with the brush while the head 17 was in contact with the film, there would be no reproduced signal, regardless of whether or not a signal was on the film. If the brush 24 was in contact with the conducting segment 40 of the ring 19 while the head was not contacting the film, there would also be no reproduced signal. Thus, the only time that a signal will be reproduced in the loudspeaker 23 is when the conducting portion 40 of the slip ring 19 is in contact with the brush 24 during the period that the head 19 is in contact with a signal portion of the film.

Now, should the beginning of a sound portion lie on the shoe 8, the brushes 24 and 25 may be rotated until the signal point on the film corresponds to the brush position point which will be when the head 17 contacts the sound portion. At this time, the arrow will point exactly to that point and the sound track may be marked and the film modified or cut at this point either then or at a later time. In the event the general location of the point has been selected by a footage number, the film 5 drives a sprocket 44 connected to a footage counter 45. Thus, when the film reaches a certain point, as indicated by the footage indicia, it can be stopped and the motor 13 energized. Although a drive pinion and gear are illustrated, the pinion 14 may be a smoothly rimmed puck in contact with a rim of the casting 16.

I claim:

1. A magnetic sound track editor comprising means for supporting a portion of a magnetic film in an arc, a magnetic head, means for rotating said magnetic head whereby said head makes contact with the unsupported portion of said magnetic sound film, a sound reproducer, and means for conducting the output of said head to said reproducer, said means including a pair of rotatable brushes and a pair of slip rings, one of said rings having a portion thereof conducting and another portion thereof non-conducting.

2. A magnetic sound track editor comprising a stationary magnetic sound track film, a magnetic reproducing head, means for rotating said head in contact with a portion of said film, a pair of slip rings, brushes adjustable over said rings, a sound reproducer, means for connecting said reproducer to said head through said rings and brushes, and means for indicating the position of said brushes with respect to said film.

3. A magnetic sound track editor in acordance with claim 2, in which one of said rings has a conducting segment and a non-conducting segment.

4. A magnetic sound track editor in accordance with claim 2, in which means are provided for adjusting said brushes and for locking said brushes in position with respect to a point on said film.

5. An editor for locating a certain point on a magnetic record, comprising a stationary shoe for supporting a magnetic film, a longitudinal portion of said film overhanging said shoe, a rotatable magnetic head adapted to contact said overhanging portion of said film, a pair of slip rings, a pair of simultaneously movable brushes in contact with said rings, and a reproducing system connected to said head through said rings and brushes, one of said rings connecting and disconnecting said head to and from said reproducing system periodically.

6. An editor in accordance with claim 5, in which said one ring has two sections, one of which is conducting, and the other of which is non-conducting.

7. An editor for locating a certain point on a magnetic record, comprising a stationary shoe for supporting a magnetic film, a longitudinal portion of said film overhanging said shoe, a rotatable magnetic head adapted to contact said overhanging portion of said film, a pair of slip rings, a pair of brushes in contact with said rings, a reproducing system connected to said head through said rings and brushes, one of said rings connecting and disconnecting said head to and from said reproducing system periodically, a partially rotatable bracket for said brushes, and means for adjusting said brushes over an arc corresponding to the arc of said shoe.

8. An editor for locating a certain point on a magnetic record, comprising a stationary shoe for supporting a magnetic film, a longitudinal portion of said film overhanging said shoe, a rotatable magnetic head adapted to contact said overhanging portion of said film, a pair of slip rings, a pair of brushes in contact with said rings, a reproducing system connected to said head through said rings and brushes, one of said rings connecting and disconnecting said head to and from said reproducing system periodically, said one ring being divided into conducting and non-conducting portions and a bracket for said brushes, said bracket supporting said brushes and being rotatable to adjust said brushes over said rings through an arc corresponding to the arc of said shoe.

9. An editor for locating a certain point on a magnetic record, comprising a stationary shoe for supporting a magnetic film, a longitudinal portion of said film overhanging said shoe, a rotatable magnetic head adapted to contact said overhanging portion of said film, a pair of slip rings, a pair of brushes in contact with said rings, a reproducing system connected to said head through said rings and brushes, one of said rings connecting and disconnecting said head to and from said reproducing system periodically, and a footage counter, said footage counter being actuated by said film to determine the general position of a point on said film to be located.

10. A magnetic sound track editor comprising means for holding a portion of a sound track film stationary, a magnetic reproducing head, means for intermittently moving said head in contact with a portion of said film, means for translating the signals on said film detected by said reproducing head into corresponding audible sound waves, slidable contact means electrically connecting said head with said translating means, and means for adjusting certain elements of said slidable contact means with respect to one another to vary the portion of said stationary film being reproduced to determine and locate a particular point on said film.

11. A magnetic sound track editing device comprising a movable magnetic pickup head, means for supporting a portion of a film so as to be physically contacted over a portion thereof by said head, means for intermittently moving said head into physical contact with said film portion, electrical contact means connected to said head, means for translating the currents picked up by said head into audible sound waves, electrical contact means connected to said translating means, means for adjusting one of said contact means with respect to said other contact means to vary the section of said film portion being translated into audible sound waves to determine and locate a particular point on said film portion, and means for indicating said point.

12. A magnetic sound track editor comprising means for holding a portion of a magnetic sound track film stationary, a magnetic reproducing head, means for cyclically moving said head in contact with and over a portion of said film, means for translating the signals on said film detected by said reproducing head into corresponding audible sound waves, and means for periodically electrically connecting said head with said translating means as said head moves over said film, said means including means for rendering said connecting means effective to connect said head to said translating means over varying sections of said film portion to determine and locate a particular point on said film.

OLIN B. GUNBY.

REFERENCES CITED

The following references are of record in the file of this patent:

UNITED STATES PATENTS

| Number | Name | Date |
|---|---|---|
| 1,825,439 | Cawley | Sept. 29, 1931 |
| 2,348,050 | Barnstyn | May 2, 1944 |